US 9,294,899 B2

(12) United States Patent
Lee

(10) Patent No.: US 9,294,899 B2
(45) Date of Patent: Mar. 22, 2016

(54) INTEGRATED SERVICE PROVISION SYSTEM USING SMART TERMINALS IN HOTEL

(71) Applicant: Han-seung Lee, Seoul (KR)

(72) Inventor: Han-seung Lee, Seoul (KR)

(*) Notice: Subject to any disclaimer, the term of this patent is extended or adjusted under 35 U.S.C. 154(b) by 215 days.

(21) Appl. No.: 14/028,442

(22) Filed: Sep. 16, 2013

(65) Prior Publication Data

US 2014/0087686 A1    Mar. 27, 2014

(30) Foreign Application Priority Data

Sep. 24, 2012  (KR) .......................... 10-2012-0105555

(51) Int. Cl.
*H04M 11/04*   (2006.01)
*H04W 4/22*   (2009.01)
*H04W 4/00*   (2009.01)

(52) U.S. Cl.
CPC ................ *H04W 4/22* (2013.01); *H04W 4/001* (2013.01)

(58) Field of Classification Search
CPC ........ G08B 19/00; G08B 26/00; H04M 11/00
USPC ...................................... 455/418, 419, 404.2
See application file for complete search history.

(56) References Cited

U.S. PATENT DOCUMENTS

| 2011/0183644 A1* | 7/2011 | Gupta | 455/404.2 |
| 2012/0011033 A1* | 1/2012 | Salgia | 705/27.2 |
| 2013/0262248 A1* | 10/2013 | Kim et al. | 705/17 |

* cited by examiner

*Primary Examiner* — Allahyar Kasraian
(74) *Attorney, Agent, or Firm* — Intellectual Property Law Group LLP

(57) ABSTRACT

The present invention is directed to an integrated service provision system using smart terminals in a hotel, including a plurality of smart terminals configured to be installed in respective hotel rooms, to each include a docking station and a smart pad, to be connected over an intranet and a wired/wireless network and provide hotel services in response to requests from the guests, to wirelessly control room conveniences, that are connected over a network, to enable reservations for performances, and ordering and payment for goods to be made via an Internet, to receive guidance on an escape route from disaster control means in real time when a disaster occurs by enabling locations of the smart terminals to be determined through connection to an access point and pairing with a Bluetooth receiver.

8 Claims, 4 Drawing Sheets

INTEGRATED SERVICE PROVISION SYSTEM USING SMART TERMINALS IN HOTEL

CROSS-REFERENCE TO RELATED APPLICATION

This application claims foreign priority under 35 U.S.C. §119 to Korean Patent Application no. 10-2012-0105555, filed in the Republic of Korea on Sep. 24, 2012, the entire contents of which are hereby incorporated by reference.

BACKGROUND

1. Field of the Invention

The present invention relates to an integrated service provision system using smart terminals in a hotel, and more particularly to an integrated service provision system using smart terminals in a hotel, which enables smart terminals in hotel rooms to wirelessly control the lighting, TVs, air conditioners, heaters, curtains, etc. of the rooms, enables guests to use hotel services or do shopping through applications provided in languages to be used, and enables the locations of the guests to be determined when a disaster occurs through the connection to wireless access points and pairing with Bluetooth receivers installed in the hotel.

2. Background Art

Generally, hotels refer to places or service companies that have facilities capable of providing lodging and food and beverages to persons having the ability to pay and provide services desired by guests.

Meanwhile, in order to operate conveniences, such as lighting, TVs, air conditioners, heaters, curtains, etc. in rooms, it is possible to use switches on bedside control tables disposed in rooms or use terminals integrated with remote control functionality. However, this scheme is problematic in that it is inconvenient for guests to use the scheme because an operating method varies depending on hotel and in that a control key should be added whenever a new device is installed.

Furthermore, in order to provide detailed guidance information about hotel facilities, room service, surrounding neighborhood information, etc. to domestic and foreign guests, there is difficulty of producing guidebooks in various languages at high expenses and providing the guidebooks in rooms.

In particular, it is inconvenient for foreigners who cannot use local languages to use room service via phones, and it is also inconvenient to use hotel facility inquiry, vehicle call and taxi call services, etc.

Meanwhile, the most dangerous problem that may occur in hotels is the case where guests cannot rapidly escape and thus lose their lives or are seriously injured in a disaster situation, such as a fire, because they are not well informed of an escape route.

Although guidance on an escape route is provided via a broadcast when a disaster occurs, it is difficult to announce the guidance in various languages within a short period of time in the case of a hotel in which foreigners from various countries are staying.

SUMMARY

Technical Problem

Accordingly, the present invention has been made keeping in mind the above problems occurring in the prior art, and an object of the present invention is to provide an integrated service provision system using smart terminals in a hotel, which enables guests to conveniently use hotel services in desired languages using smart terminals.

Another object of the present invention is to provide an integrated service provision system using smart terminals in a hotel, which enables conveniences (hereinafter referred to as "room conveniences"), such as the lighting, TVs, air conditioners, heaters, curtains, etc. of rooms, to be wirelessly controlled using smart pads.

A further object of the present invention is to provide an integrated service provision system using smart terminals in a hotel, which enables information about goods to be obtained and scheduled purchase, order and payment services to be provided, in rooms.

Yet another object of the present invention is to provide an integrated service provision system using smart terminals in a hotel, which enables the locations of smart pads to be determined when a disaster occurs, so that guidance on an escape route can be provided by a hotel server in real time, and also enables emergency and surrounding situations with which guests are faced to be viewed through cameras provided in smart pads when a disaster occurs.

Still another object of the present invention is to provide an integrated service provision system using smart terminals in a hotel, which enables radio calls to an administrator via smart pads containing radio modules even though there is a problem with a hotel network and a communication network when a disaster occurs.

Technical Solution

According to the present invention, there is provided an integrated service provision system using smart terminals in a hotel, including a plurality of smart terminals (10) configured to be installed in respective hotel rooms, to each include a docking station (100) and a smart pad (200) and be selectively combined and separated, to provide one or more applications in languages to be used by guests, to be connected over an intranet and a wired/wireless network and provide hotel services in response to requests from the guests, to wirelessly control room conveniences, such as lighting, TVs, air conditioners, heaters, curtains, etc. of rooms, that are connected over a network, to enable reservations for performances, and ordering and payment for goods to be made via an Internet, to receive guidance on an escape route from disaster control means (50) in real time when a disaster occurs by enabling locations of the smart terminals (10) to be determined through connection to an access point (60*a*) and pairing with a Bluetooth receiver (60*b*), to transfer information about emergency and surrounding situations of the guests via cameras provided in the smart pads when a disaster occurs, and to enable radio calls; and a hotel server (20) configured to determine information about a location of the smart terminal (10) by receiving at least one of a signal indicative of connection to the access point (60*a*) and a signal indicative of pairing with the Bluetooth receiver (60*b*), and to enable radio calls with the smart terminals (10).

The integrated service provision system may further include a communication company server (40) configured to enable the smart terminals (10) to perform telephone and data communication via a base station (41); and a payment server (30) configured to enable payments for purchases of goods of one or more companies that have formed an alliance with the hotel.

The integrated service provision system may further include disaster control means (50) configured to receive information about locations of the smart pads (100) from the hotel server (20) and to provide the guidance on the escape route in real time and perform a rescue operation in case of emergency.

The disaster control means (50) may include one or more of a hospital server, a fire station server, a police station server and a security company server and be connected to the hotel server (20) over a network in order to handle an emergency situation in cooperation with the hotel server (20) when a disaster occurs.

The integrated service provision system may further include a plurality of artificial satellites (70) configured to transmit carriers to the smart pads (200) equipped with the GPS module units (222) in order to determine locations using a GPS while the smart pads (200) are moving outside the hotel.

Each of the smart terminals (10) may include a docking station (100) and a smart pad (200); and the docking station (100) may include a docking unit (102) connected to a docking unit (202) of the smart pad (200), and configured to perform data transmission and reception; a wired/wireless network unit (106) configured to perform connection with the Internet and an intranet of the hotel server (20); a wireless control module unit (118) configured to wirelessly control the room conveniences in response to input signals of the smart pad (200); a card reader unit (116) configured to receive card information upon payment for reservation or for goods; a print module unit (110) configured to output details of payment or reservation; and a control unit (120) configured to control data transmission and reception with the smart pad (200), to determine whether connection with the smart pad (200) has been established, and to perform control so that power is supplied by the power unit (122) and the smart pad (200) is charged with power.

The docking station (100) may further include a display output unit (108) configured to output image signals of the smart pad (200) to the outside; an audio input and output unit (112) configured to handle the audio signal output of the smart pad (200) and external audio signal input; and a USB module unit (114) configured to store one or more files stored in the smart pad (200) to USB memory.

The smart pad (200) may include a docking unit (202) connected to the docking unit (102) of the docking station (100) and to perform battery charging and data transmission and reception; a display unit (208) configured to include a touch pad and to display key input and a screen; a wireless network unit (206) configured to establish connections to the Internet and the intranet via an access point (60a); a communication module unit (216) configured to perform telephone connection via a communication network; a Bluetooth module unit (218) configured to transmit location information through pairing with the Bluetooth receiver (60b) installed in the hotel; a memory unit (204) configured to store the rescue application that is automatically executed in response to a command received from the hotel server (20) when a disaster occurs; an audio input and output unit (212) configured to perform voice input and output; and a control unit (220) configured to wirelessly control room conveniences through data transmission and reception with the docking station (100), to receive a rescue application execution command from the hotel server (20) and then execute the rescue application when a disaster occurs, and to perform control so that information about a location of the smart pad (200) is transferred.

The rescue application may be automatically executed by the hotel server (20) when an emergency situation occurs, display the location of the guest, the escape route, the location of an emergency exit and the location of a fire extinguisher, and may be equipped with a function of making call connections with persons in charge, such as an administrator, a fire station dispatcher, a police station dispatcher, etc.

The smart pad (200) may further include a camera module unit (210) configured to receive images of emergency and surrounding situations with which the guest is faced when a disaster occurs; and a radio module unit (214) configured to enable radio communication in a situation where the Internet and communication are not available.

Advantageous Effects

The integrated service provision system using smart terminals in a hotel and the smart terminals according to the present invention are advantageous in that guests can conveniently use hotel services using smart terminals in desired languages and expenses required to produce guidebooks in various languages can be saved.

Furthermore, the integrated service provision system using smart terminals in a hotel and the smart terminals are advantageous in that conveniences, such as the lighting, TVs, air conditioners, heaters and curtains of rooms, connected with docking stations equipped with control systems over a network can be wirelessly controlled, and reservation, ordering and payment services for performances, restaurants, bars and duty-free shops can be provided using smart terminals in rooms.

Furthermore, the integrated service provision system using smart terminals in a hotel and the smart terminals are advantageous in that, when a disaster occurs, the locations of the smart pads are determined and thus guidance on an escape route can be provided by the disaster control means in real time, situations with which guests are faced can be checked through the camera provided in the smart pads, and radio calls to an administrator are enabled through the smart pads containing the radio modules even when there is a problem with a hotel network and a communication network, thereby enabling the quick handling of a disaster situation and thus ensuring the safety of hotel guests in case of emergency.

Figure 1:
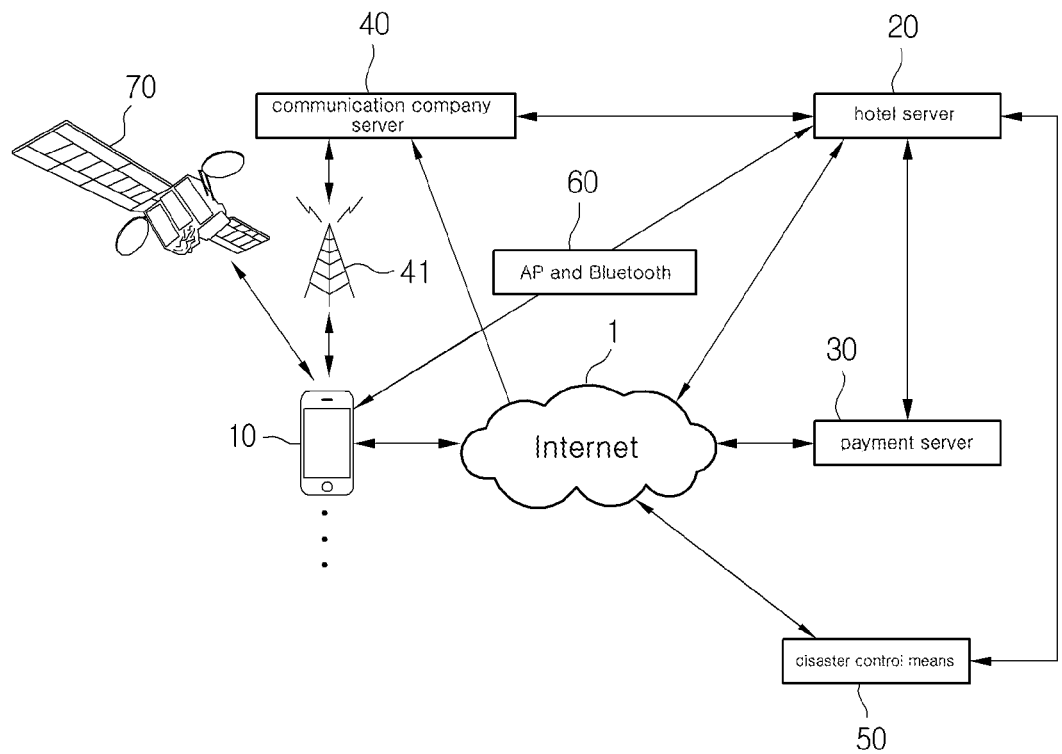
FIG. 1 is a block diagram illustrating the configuration of an integrated service provision system using smart terminals in a hotel according to an embodiment of the present invention.

| Description of Reference Numerals | |
|---|---|
| 1: Internet network | 10: smart terminal |
| 20: hotel server | 30: payment server |
| 40: communication company server | 41: base station |
| 50: disaster control means | 60a: access point(AP) |
| 60b: Bluetooth receiver | 70: artificial satellites |
| 100: docking station | 102, 202: docking unit |
| 104, 204: memory unit | 106: wired/wireless network unit |
| 108: display output unit | 110: print module unit |

-continued

Description of Reference Numerals 112, 212: audio input and output unit
114: USB module unit
116: card reader unit
118: remote control module unit
120, 220: control unit
206: wireless network unit
208: display unit
210: camera module unit
214: radio module unit
216: communication module unit
218: Bluetooth module unit
222: GPS module unit

DETAILED DESCRIPTION OF SPECIFIC EMBODIMENTS

An integrated service provision system using smart terminals in a hotel according to the present invention will be described below with reference to the accompanying drawings.

FIG. 1 is a block diagram illustrating the configuration of an integrated service provision system using smart terminals in a hotel according to an embodiment of the present invention.

As illustrated in FIG. 1, the integrated service provision system using smart terminals in a hotel includes a plurality of smart terminals 10 configured to be installed in respective hotel rooms, to each include a docking station 100 and a smart pad 200 and be selectively combined and separated, to provide one or more applications in languages to be used by guests, to be connected over an intranet and a wired/wireless network and provide hotel services in response to requests from the guests, to wirelessly control room conveniences, such as lighting, TVs, air conditioners, heaters, curtains, etc. of rooms, that are connected over a network, to enable reservations for performances, and ordering and payment for goods to be made via the Internet network 1 through a payment server 30 capable of enabling payments for purchases of goods of one or more companies that have formed an alliance with the hotel, to receive guidance on an escape route from disaster control means 50 in real time when a disaster occurs by enabling locations of guests to be determined through connection to an access point 60a and pairing with a Bluetooth receiver 60b, to transfer information about emergency and surrounding situations of the guests via cameras provided in the smart pads when a disaster occurs, and to enable radio calls, and a hotel server 20 configured to determine information about a location of the smart terminal 10 by receiving at least one of a signal indicative of connection to the access point 60a and a signal indicative of pairing with the Bluetooth receiver 60b and to enable radio calls with the smart terminals 10; a communication company server 40 configured to enable the smart terminals 10 to perform telephone and data communication via a base station 41; disaster control means 50 including a hospital server, a fire station server, a police station server and a security company server, configured to receive information about locations of the smart pads 100 from the hotel server 20, and to provide the guidance on the escape route in real time and perform a rescue operation in case of emergency; and a plurality of artificial satellites 70 configured to transmit carriers to the smart pads 200 equipped with the GPS module units 222 in order to determine locations using a GPS while the smart pads 200 are moving outside the hotel.

The smart terminal 20 may be configured in a form in which multiple smart pads 200 are coupled to a single docking station 100.

For example, it is preferred that a number of mobile phone-sized smart pads 200 equal to the number of guests who have checked into a room be provided and distinguished by unique numbers, and thus the mobile phone-sized smart pads 200 can be easily used when the guests go out or move individually.

Since evacuation is not easy if a plurality of persons is dependent upon a signal smart pad 200 in the event of the occurrence of a disaster, it is preferred that smart pads 200 be provided to respective persons.

Furthermore, it is preferred that the smart pads 200 be provided with mobile telecommunication and radio communication functions. The mobile telecommunication function is the function of enabling mobile communication calls to be made via a local 2G, 3G or 4G network at local rates. This function is advantageous in that foreigners can save overseas roaming expenses and in that calls between terminals that have been made to subscribe en bloc by the hotel can be made free of charge, thereby allowing a group of quests to conveniently make calls with each other even when they have moved to different areas. It is preferable to allow radio communication calls and mobile communication calls between a group of guests to be made free of charge.

It is preferred that the hotel server 20 remotely set the language of an OS and applications to be executed on the smart pad 200 in such a way as to allow the guest to select a language to be used in advance or that the user directly select a language on the smart terminal 10. For example, the language to be used may include English, Japanese, Chinese, German, French, Spanish, and Russian.

It is preferred that the access point 60a and the Bluetooth receivers 60b be installed in rooms, hallways, lobbies, emergency stairs and elevators. The hotel server 20 determines the locations of the smart pads 200 carried by the guests by analyzing the connections with the access points 60a and pairing signals with the Bluetooth receivers 60b.

It is preferred that the payment server 30 be connected to the hotel server 20 and enable a guest staying in a corresponding hotel to make discount payments when he or she pays for goods of a company that has formed an alliance with the hotel.

It is preferred that the hotel server 20 provide discount information regarding performances, product purchases, tourist goods, etc. to the individual smart pads 200 over an intranet and the payment server 30 allow coupon discounts and alliance discounts to be applied when payments are made based on the information provided by the hotel server 20.

It is preferred that the disaster control means 50 include a hospital server, a fire station server, a police station server and a security company server and be connected to the hotel server 20 over a network in order to handle an emergency situation in cooperation with the hotel server 20 when a disaster occurs.

It is preferred that, for example, when a fire occurs, an alarm signal regarding the occurrence of the fire be transferred to the individual disaster control means even when there is no request, thereby enabling rapid cooperation.

The artificial satellites 70 may send carriers to the smart pads 200 equipped with the GPS module units 222, and the GPS module units 222 may determine the longitude/latitude coordinates and altitude information of their current locations by computing the times at which the radio waves transmitted from the four or more artificial satellites 70 arrive.

Figure 2:
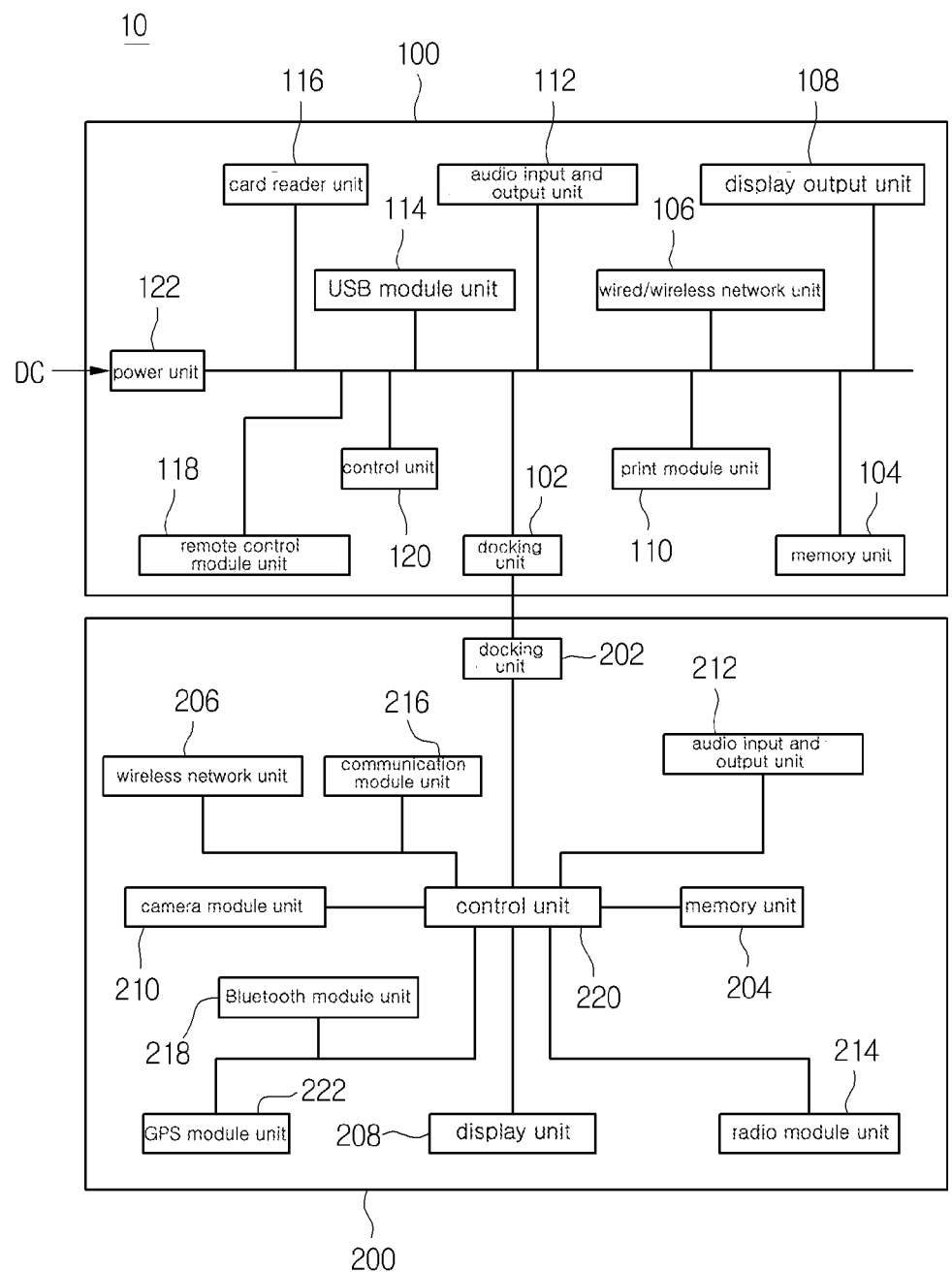
FIG. 2 is a block diagram illustrating the configuration of a smart terminal according to an embodiment of the present invention.

FIG. 2 is a block diagram illustrating the configuration of a smart terminal according to an embodiment of the present invention.

Referring to FIG. 2, the smart terminal 10 includes a docking station 100 and a smart pad 200; and the docking station 100 includes a docking unit 102 connected to the docking unit 202 of the smart pad 200, and configured to perform data transmission and reception; a wired/wireless network unit 106 configured to perform connection with the Internet and the intranet of the hotel server 20; a wireless control module unit 118 configured to wirelessly control the room conveniences, such as lighting, TVs, air conditioners, heaters, curtains, etc. of rooms, that are connected over a network, in response to input signals of the smart pad 200; a card reader unit 116 configured to receive card information upon payment for reservation or for goods; a print module unit 110 configured to output the details of payment or reservation; a control unit 120 configured to control data transmission and reception with the smart pad 200, to determine whether connection with the smart pad 200 has been established, and to perform control so that power is supplied by the power unit 122 and the smart pad 200 is charged with power; a display output unit 108 configured to output image signals of the smart pad 200 to the outside; an audio input and output unit 112 configured to handle the audio signal output of the smart pad 200 and external audio signal input; and a USB module unit 114 configured to store one or more files stored in the smart pad 200 to USB memory.

The card reader unit 116 includes a near field communication module (not illustrated) and a magnetic reader module (not illustrated), and receives the information of a near field communication (NFC) device, an RFID tag, a credit card, an IC card, etc.

The display output unit 108 outputs the screens of the smart pad 200 to TVs, thereby enabling photos and moving images to be viewed and also a web browser to be executed on a large-sized screen.

The control unit 120 transmits information about whether the smart pad 200 is docked to the hotel server 20 when a disaster occurs, thereby enabling the determination of whether a guest is carrying the smart pad 200 or not.

The smart pad 200 includes a docking unit 202 connected to the docking unit 102 of the docking station 100 and to perform battery charging and data transmission and reception; a display unit 208 configured to include a touch pad and to display key input and a screen; a wireless network unit 206 configured to establish connections to the Internet and the intranet via an access point 60a; a communication module unit 216 configured to perform telephone connection via a communication network; a Bluetooth module unit 218 configured to transmit location information through pairing with the Bluetooth receiver 60b installed in the hotel; a memory unit 204 configured to store basic OS program and one or more applications, and configured to store the rescue application that is automatically executed in response to a command received from the hotel server 20 when a disaster occurs; an audio input and output unit 212 configured to perform voice input and output; a control unit 220 configured to wirelessly control room conveniences through data transmission and reception with the docking station 100, to receive a rescue application execution command from the hotel server 20 and then execute the rescue application when a disaster occurs, and to perform control so that information about a location of the smart pad 200 is transferred; a camera module unit 210 configured to receive images of emergency and surrounding situations with which the guest is faced when a disaster occurs; and a radio module unit 214 configured to enable radio communication in a situation where the Internet and communication are not available.

It is preferred that the camera module units 210 be disposed on the front and rear portions of the smart pad 200, thereby enabling front and rear images of a situation with which the guest is faced to be viewed at the same time when a disaster occurs.

Furthermore, it is preferable to activate flashlights (not illustrated) operating in conjunction with the camera module unit 210, thereby enabling the guest to safely find and follow the escape route when a disaster occurs and power is lost. In order to provide notification of the location of the guest in a situation where it is impossible to move, it is preferred that a maximum volume of alarm sound be output through the audio input and output unit 212. It is preferred that the activation of the flashlights and the output of the alarm sound be performed via the hotkey menu of the rescue application.

The GPS module unit 222 may determine the longitude/latitude coordinates and altitude information of its current location by computing the times at which radio waves transmitted from the four or more artificial satellites 70 arrive. Thereafter, the GPS module unit 222 may indicate the location on map data and then transmit it to the hotel server 20.

The rescue application is an application that is automatically executed by the hotel server 20 when an emergency situation occurs, displays the location of the guest, an escape route, the location of an emergency exit and the location of a fire extinguisher, and is equipped with the function of making call connections with persons in charge, such as an administrator, a fire station dispatcher, a police station dispatcher, etc.

Figure 3:
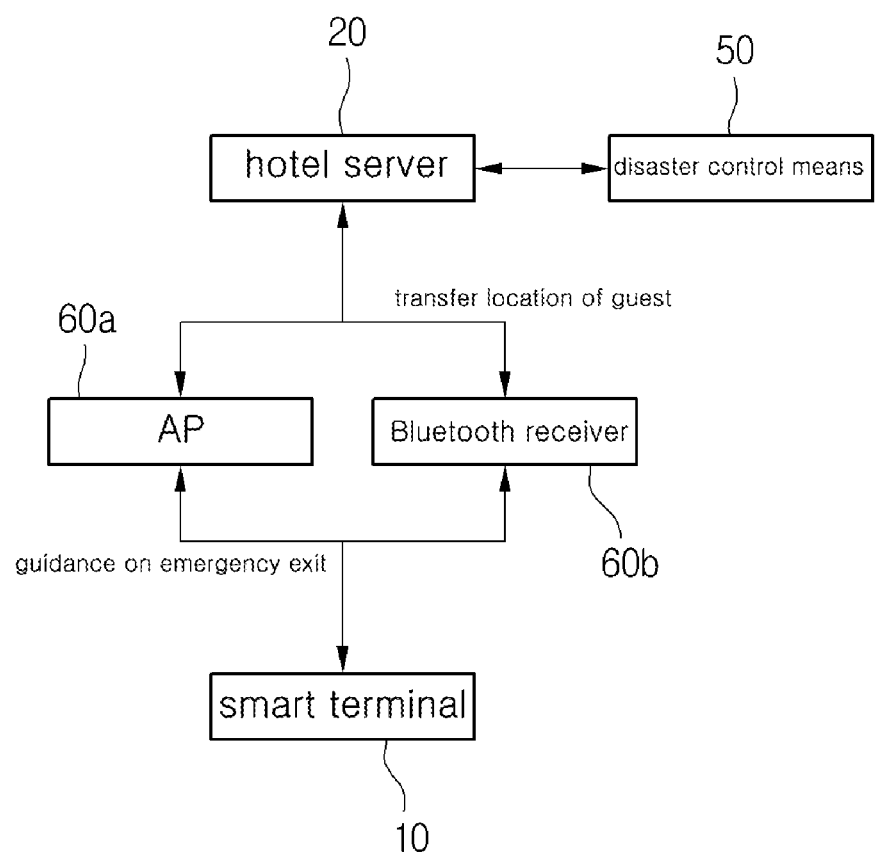
FIG. 3 is a block diagram illustrating a configuration that can provide guidance on an escape route based on the location of a guest when a disaster occurs according to an embodiment of the present invention.

FIG. 3 is a block diagram illustrating a configuration that can provide guidance on an escape route based on the location of a guest when a disaster occurs according to an embodiment of the present invention.

Referring to FIG. 3, when a disaster, such as a fire, occurs, the hotel server 20 checks the connection of the smart pad 200 of each of the smart terminals 10 to the access point 60a, and pairing of the smart pad 200 of each of the smart terminals 10 with the Bluetooth receiver 60b.

It is preferred that once the location of the smart pad 200 has been determined, the hotel server 20 transmit a rescue application execution signal, and thus a corresponding application can be automatically executed and, at the same time, the front or rear camera be automatically activated.

The hotel server 20 guides the guest through the escape route using the rescue application of the smart pad 200, and transfers information about a situation with which the guest is faced to the disaster control means 50, thereby sharing information about the location of the guest.

The reason why the hotel server 20 shares information about the location of the guest with the disaster control means 50 is that in preparation for the case where it is difficult to normally escape through the escape route, the disaster control means 50 determines the location of the guest in real time, thereby facilitating a rescue operation.

If it is determined upon the occurrence of a disaster that the smart pad 200 is not connected to the docking station 100, the hotel server 20 automatically executes the rescue application and then checks the image of a situation with which the guest is faced.

Since the guest is highly likely not to carry the smart pad 200 or an emergency situation is highly likely to occur if it is impossible to check the image of a situation with which the guest is faced, it is preferable to check the location of the smart pad 200 and dispatch rescue personnel to the corresponding location. Additionally, it is preferable to make a radio call to the guest and then check whether there is a response.

If it is determined that the smart pad 200 has been connected to the docking station 100 when a disaster occurs, it is preferable to consider the guest to stay in his or her room and check whether the guest is in a safe state by additionally making a phone call via a wired telephone.

Figure 4:
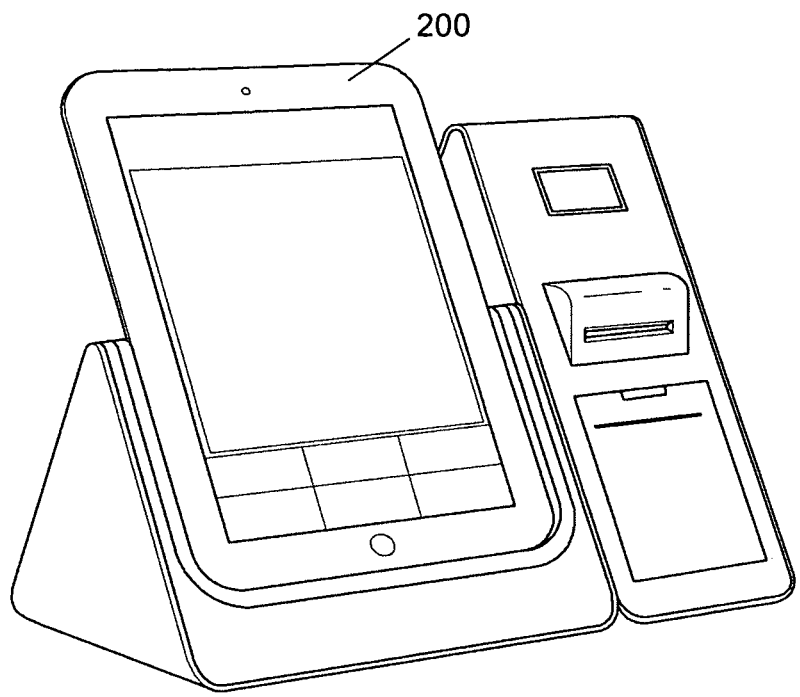
FIGS. 4 and 5 are diagrams illustrating the shape of a smart terminal according to an embodiment of the present invention.
Figure 5:
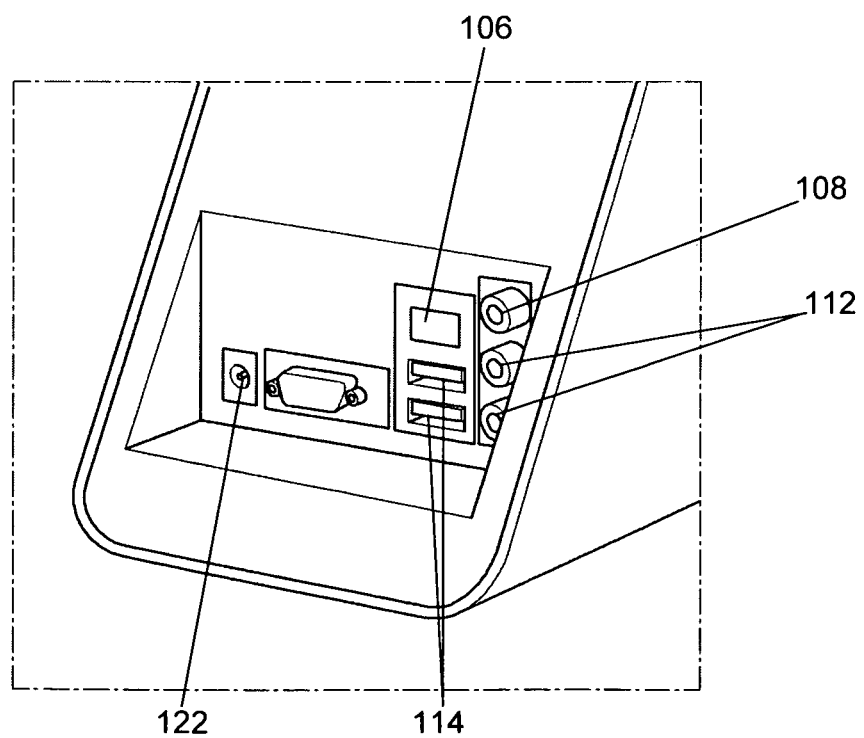

FIGS. 4 and 5 are diagrams illustrating the shape of a smart terminal according to an embodiment of the present invention. The smart pad 200 and a station in which the smart pad 200 is seated and docked are provided on the left side of the smart terminal, and a station provided with card reading and output functions is provided on the right side thereof.

The power unit 122, the display output unit 108, the wired/wireless network unit 106, the USB module unit 114 and the audio input and output unit 112 are provided on the back of the right station, thereby enhancing extendibility.

What is claimed is:

1. An integrated service provision system using smart terminals in a hotel, including:
    a plurality of smart terminals (10) configured to be installed in respective hotel rooms, to each include a docking station (100) and a smart pad (200) and be selectively combined and separated, to provide one or more applications in languages to be used by guests, to be connected over an intranet and a wired/wireless network and provide hotel services in response to requests from the guests, to wirelessly control room conveniences including lighting, TVs, air conditioners, heaters, curtains of rooms, that are connected over a network, to enable reservations for performances, and ordering and payment for goods to be made via an Internet, to receive guidance on an escape route from disaster control means (50) in real time when a disaster occurs by enabling locations of the smart terminals (10) to be determined through connection to an access point (60a) and pairing with a Bluetooth receiver (60b), to transfer information about emergency and surrounding situations of the guests via cameras provided in the smart pads when a disaster occurs, and to enable radio calls; and
    a hotel server (20) configured to determine information about a location of the smart terminal (10) by receiving at least one of a signal indicative of connection to the access point (60a) and a signal indicative of pairing with the Bluetooth receiver (60b), and to enable radio calls with the smart terminals (10);
    and the smart pad (200) includes:
    a docking unit (202) connected to a second docking unit (102) of the docking station (100) and to perform battery charging and data transmission and reception;
    a display unit (208) configured to include a touch pad and to display key input and a screen;
    a wireless network unit (206) configured to establish connections to the Internet and the intranet via an access point (60a) a communication module unit (216) configured to perform telephone connection via a communication network;
    a Bluetooth module unit (218) configured to transmit location information through pairing with the Bluetooth receiver (60b) installed in the hotel;
    a memory unit (204) configured to store a rescue application that is automatically executed in response to a command received from the hotel server (20) when a disaster occurs;
    an audio input and output unit (212) configured to perform voice input and output;
    a control unit (220) configured to wirelessly control room conveniences through data transmission and reception with the docking station (100), to receive the rescue application execution command from the hotel server (20) and then execute the rescue application when a disaster occurs, and to perform control so that information about a location of the smart pad (200) is transferred;
    a camera module unit (210) configured to receive images of emergency and surrounding situations with which a guest is faced when a disaster occurs; and a radio module unit (214) configured to enable radio communication in a situation where the Internet and communication are not available; and
    in order to provide notification of a location of the guest in a situation where it is impossible to move, it is preferred that a maximum volume of an alarm sound be output through the audio input and output unit (212);
    and when it is determined upon the occurrence of a disaster that the smart pad (200) is not connected to the docking station (100), the hotel server (20) automatically executes the rescue application and then checks the image of a situation with which the guest is faced.

2. The integrated service provision system of claim 1, further including a communication company server (40) configured to enable the smart terminals (10) to perform telephone and data communication via a base station (41); and a payment server (30) configured to enable payments for purchases of goods of one or more companies that have formed an alliance with the hotel.

3. The integrated service provision system of claim 1, further including disaster control means (50) configured to receive information about locations of the smart pads (100) from the hotel server (20) and to provide the guidance on the escape route in real time and perform a rescue operation in case of emergency.

4. The integrated service provision system of claim 3, wherein the disaster control means (50) include one or more of a hospital server, a fire station server, a police station server and a security company server and are connected to the hotel server (20) over a network in order to handle an emergency situation in cooperation with the hotel server (20) when a disaster occurs.

5. The integrated service provision system of claim 1, further including a plurality of artificial satellites (70) configured to transmit carriers to the smart pads (200) equipped with the GPS module units (222) in order to determine locations using a GPS while the smart pads (200) are moving outside the hotel.

6. The integrated service provision system of claim 1, wherein:
    the docking station (100) includes:
    the second docking unit (102) connected to the docking unit (202) of the smart pad (200), and configured to perform data transmission and reception;
    a wired/wireless network unit (106) configured to perform connection with the Internet and an intranet of the hotel server (20);
    a wireless control module unit (118) configured to wirelessly control the room conveniences in response to input signals of the smart pad (200);
    a card reader unit (116) configured to receive card information upon payment for reservation or for goods;
    a print module unit (110) configured to output details of payment or reservation; and
    a control unit (120) configured to control data transmission and reception with the smart pad (200), to determine whether connection with the smart pad (200) has been established, and to perform control so that power is supplied by the power unit (122) and the smart pad (200) is charged with power.

7. The integrated service provision system of claim 6, wherein the docking station (100) further includes:
- a display output unit (108) configured to output image signals of the smart pad (200) to an outside;
- an audio input and output unit (112) configured to handle the audio signal output of the smart pad 200 and external audio signal input; and
- a USB module unit (114) configured to store one or more files stored in the smart pad (200) to USB memory.

8. The integrated service provision system of claim 1, wherein the rescue application is automatically executed by the hotel server (20) when an emergency situation occurs, displays a location of the guest, the escape route, a location of an emergency exit and a location of a fire extinguisher, and is equipped with a function of making call connections with persons in charge, including an administrator, a fire station dispatcher, and a police station dispatcher.

\* \* \* \* \*